(12) United States Patent
Curran et al.

(10) Patent No.: US 9,745,703 B2
(45) Date of Patent: Aug. 29, 2017

(54) PAVEMENT SLAB ASSEMBLY AND METHOD OF BUILDING A PAVEMENT SLAB ASSEMBLY

(71) Applicant: Bombardier Transportation GmbH, Berlin (DE)

(72) Inventors: Éanna Curran, Mannheim (DE); Sergio Pérez, Alsbach-Hahnlein (DE); Oliver Vietzke, Berlin (DE)

(73) Assignee: Bombardier Transportation GmbH, Berlin (DE)

( * ) Notice: Subject to any disclaimer, the term of this patent is extended or adjusted under 35 U.S.C. 154(b) by 185 days.

(21) Appl. No.: 14/425,442

(22) PCT Filed: Sep. 3, 2013

(86) PCT No.: PCT/EP2013/068135
§ 371 (c)(1),
(2) Date: Mar. 3, 2015

(87) PCT Pub. No.: WO2014/037324
PCT Pub. Date: Mar. 13, 2014

(65) Prior Publication Data
US 2015/0225906 A1    Aug. 13, 2015

(30) Foreign Application Priority Data

Sep. 4, 2012    (GB) .................................. 1215759.0

(51) Int. Cl.
*E01C 9/00* (2006.01)
*B60M 7/00* (2006.01)
(Continued)

(52) U.S. Cl.
CPC .............. *E01C 9/00* (2013.01); *B60L 11/182* (2013.01); *B60L 11/1831* (2013.01);
(Continued)

(58) Field of Classification Search
CPC . E01C 9/00; E01C 5/003; E01C 11/16; B60L 11/182; B60L 11/1831
See application file for complete search history.

(56) References Cited

U.S. PATENT DOCUMENTS

| 4,836,344 A | 6/1989 | Bolger |
|---|---|---|
| 5,207,304 A | 5/1993 | Lechner et al. |

(Continued)

FOREIGN PATENT DOCUMENTS

| CN | 1659060 A | 8/2005 |
|---|---|---|
| CN | 102596633 A | 7/2012 |

(Continued)

*Primary Examiner* — Abigail A Risic
(74) *Attorney, Agent, or Firm* — The Webb Law Firm

(57) ABSTRACT

A pavement slab assembly for a route for vehicles driving or standing on a surface of the route. The pavement slab assembly consists at least partially of pavement material and has a cable bearing element. Electric line or lines extend(s) along or under the surface of the pavement slab assembly. The cable bearing element is embedded in the pavement material of the pavement slab assembly and is arranged within the pavement slab assembly such that the cable bearing element is enclosed by the pavement material. The invention also relates to a method of building a pavement slab assembly, a route for vehicles, and a method for building a route for vehicles.

20 Claims, 8 Drawing Sheets

(51) Int. Cl.
  *B60L 11/18* (2006.01)
  *E01C 5/00* (2006.01)
  *E01C 11/16* (2006.01)

(52) U.S. Cl.
  CPC ............. *B60M 7/003* (2013.01); *E01C 5/003* (2013.01); *E01C 11/16* (2013.01); *B60L 2200/26* (2013.01); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(56) References Cited

U.S. PATENT DOCUMENTS

| | | | |
|---|---|---|---|
| 5,881,527 A | 3/1999 | Haseotes | |
| 6,558,071 B1* | 5/2003 | Sproules | E01C 5/08 404/78 |
| 8,827,011 B2 | 9/2014 | Benoliel | |
| 8,997,955 B2 | 4/2015 | Czainski et al. | |
| 9,038,796 B2 | 5/2015 | Woronowicz et al. | |
| 2005/0178632 A1* | 8/2005 | Ross | B60L 5/005 191/10 |
| 2009/0038902 A1* | 2/2009 | Yechuri | B60L 5/005 191/48 |
| 2012/0261482 A1* | 10/2012 | Vollenwyder | B60L 5/005 238/14.05 |
| 2013/0092491 A1 | 4/2013 | Suh et al. | |
| 2013/0154553 A1* | 6/2013 | Steele | B60L 11/182 320/108 |
| 2013/0248311 A1 | 9/2013 | Czainski et al. | |
| 2014/0151175 A1* | 6/2014 | Vietzke | B60L 5/005 191/10 |
| 2014/0270955 A1* | 9/2014 | Coe | E01C 23/10 404/77 |
| 2015/0321567 A1* | 11/2015 | Czainski | B60L 11/182 191/10 |
| 2015/0332827 A1* | 11/2015 | Omori | H01F 38/14 307/104 |
| 2015/0372498 A1* | 12/2015 | Ichikawa | B60L 11/1803 307/104 |
| 2016/0035911 A1* | 2/2016 | Barruel | H01L 31/0236 136/256 |
| 2016/0036354 A1* | 2/2016 | Erickson | F03G 7/08 290/1 R |

FOREIGN PATENT DOCUMENTS

| | | |
|---|---|---|
| GB | 2476318 A | 6/2011 |
| GB | 2485616 A | 5/2012 |
| GB | 2485617 A | 5/2012 |
| KR | 1020120058892 A | 6/2012 |
| WO | 9530556 A2 | 11/1995 |
| WO | 2010031596 A2 | 3/2010 |
| WO | 2011043628 A2 | 4/2011 |
| WO | 2011046414 A2 | 4/2011 |
| WO | 2011062452 A2 | 5/2011 |
| WO | 2011076435 A1 | 6/2011 |
| WO | 2012069495 A2 | 5/2012 |

\* cited by examiner

PAVEMENT SLAB ASSEMBLY AND METHOD OF BUILDING A PAVEMENT SLAB ASSEMBLY

CROSS-REFERENCE TO RELATED APPLICATIONS

This application is the United States national phase of International Application No. PCT/EP2013/068135 filed Sep. 3, 2013, and claims priority to United Kingdom Patent Application No. 1215759.0 filed Sep. 4, 2012, the disclosures of which are hereby incorporated in their entirety by reference.

BACKGROUND OF THE INVENTION

Field of the Invention

The invention relates to a pavement slab assembly for a route for vehicles driving or standing on a surface of the route, in particular a route for road automobiles. The vehicle can be, for example, a road automobile having wheels which can be steered by a driver of the vehicle. However, it is also possible that a track-bound vehicle travels on the route, such as a rail vehicle driving on rails which are embedded in the route. Furthermore, the invention relates to a method for building a pavement slab assembly. Furthermore, the invention relates to a route for vehicles made of a plurality of pavement slab assemblies and a method for building such a route.

Description of Related Art

While travelling on a route vehicles require energy for driving (i.e. propulsion) and for auxiliary equipment which does not produce propulsion of the vehicle. Such auxiliary equipment includes, for example, lighting systems, heating and/or air-conditioning systems, ventilation and passenger information systems. Not only track-bound vehicles (such as trams), but also road automobiles can be operated using electric energy. If continuous electric contact between the travelling vehicle and an electric rail or wire along the route is not desired, electric energy can be either withdrawn from an on-board energy storage or can be received by induction from an arrangement of electric lines of the route.

The transfer of electric energy to the vehicle by induction forms a background of the invention. A route-sided conductor arrangement (primary side) produces an electromagnetic field. The field is received by a coil (secondary side) on board of the vehicle so that the field produces an electric voltage by induction. The transferred energy may be used for propulsion of the vehicle and/or for other purposes such as providing the auxiliary equipment of the vehicle with energy.

Generally speaking, the vehicle may be, for example, a vehicle having an electrically operated drive motor. However, the vehicle may also be a vehicle having a hybrid drive system, e.g. a system which can be operated by electric energy or by other energy, such as energy provided using fuel (e.g. natural gas, diesel fuel, petrol or hydrogen).

WO 95/30556 A2 describes a system wherein electric vehicles are supplied with energy from the roadway. The all-electric vehicle has one or more on-board energy storage elements or devices that can be rapidly charged or supplied with energy obtained from an electrical current, for example a network of electromechanical batteries. The energy storage elements may be charged while the vehicle is in operation. The charging occurs through a network of power coupling elements, e.g. coils, embedded in the track. Induction coils are located at passenger stops in order to increase passenger safety.

In contrast, the focus of the present invention is to continuously transfer energy to the vehicle while it travels or stands on the route. WO 2010/031596 A2 discloses a shaped block for positioning and/or holding a plurality of line sections of one or more electric lines along a driving way of a vehicle, wherein the shaped block has a plurality of recesses and/or projections, wherein the edges of the recesses and/or projections for the line sections in each case form the boundary of a space into which one of the line sections can be brought, so that it extends in a longitudinal direction of the space, and wherein the longitudinal directions of the spaces, delimited by the edges of the recesses and/or by the projections, extend essentially parallel to one another in a common plane.

If an alternating electric current flows through the electric lines, an electromagnetic field is produced that induces an electric current in a receiver of a vehicle which is travelling on the driving way. The shaped blocks facilitate the laying of the electric lines in the driving way. WO 2010/031596 A2 discloses ways of integrating the shaped blocks in railways for rail vehicles. For example, the shaped blocks are placed in between the rails, the electric lines are laid into the spaces defined by the blocks and the blocks are covered by lids. The shaped blocks, however, do not provide a driving surface for vehicles, in particular for a train.

U.S. Pat. No. 4,836,344 discloses an electrical modular roadway system adapted for transmitting power to vehicles and controlling inductively coupled vehicles travelling thereon. The system comprises a plurality of elongated, electrically connected inductor modules arranged in an aligned end to end spaced apart order to form a continuous vehicle path. Each module has a magnetic core and power windings which generate a magnetic field extending above the road surface. The modules are embedded in the ground so as to be flush with the roadway surface over which a vehicle can travel. Each module is an elongated structure of uniform width and thickness so that they can be easily fabricated in quantity and readily installed in a roadbed with a minimum of labor and equipment. Each module comprises an iron core around which is wrapped a power winding comprising a series of coils.

In GB 2485616 A, a route for vehicles driving on a surface of the route is disclosed, wherein the route comprises a plurality of shaped blocks adapted to position and/or to hold a plurality of line sections of one or more electric lines. Each shaped block comprises recesses forming spaces and/or projections delimiting spaces for receiving at least one of the line sections, the electric line or lines extend(s) through the spaces, the electric line or lines extend(s) along the surface of the route in and/or about the travelling direction of vehicles which are driving on the route. The shaped blocks and the electric line or lines are supported by a base layer of the route and the shaped blocks and the electric line or lines are covered by a cover layer of the route. The material of the cover layer is also located in regions of the route sideways of the shaped blocks so that the shaped blocks and the cover layer form an integrated layer on top of the base layer. The document describes a layered composition of the route which is built on site.

WO 2011/046414 A2 discloses a power supply apparatus for supplying power to an electric vehicle by a magnetic induction mechanism.

WO 2011/062452 A2 discloses a cable protection structure buried within a recessed portion defined below a surface of a road along a longitudinal direction of the road.

WO 2012/069495 A2 discloses a system for transferring electric energy to a vehicle, in particular to a road automobile or to a track bound vehicle such as a light rail vehicle, wherein the system comprises an electric conductor arrangement for producing a magnetic field and for thereby transferring the energy to the vehicle.

U.S. Pat. No. 5,207,304A discloses a power pickup system for an electrically powered vehicle.

It is an object of the present invention to provide a pavement slab assembly for building a route for vehicles, including at least one electric line for inductively transferring energy to the vehicles travelling or standing on the route, wherein the route shall be robust, durable and it shall be possible to install the route with low effort, in particular with a reduced installation time. In particular, it shall be possible for vehicles to drive across the region of the route where the electric line or electric lines are laid.

U.S. Pat. No. 4,836,344 and WO 2010/031596 A2 disclose that modules for the electric line(s) can be pre-fabricated. These pre-fabricated modules, however, have to be installed on site which requires modifying an existing composition of the route. After placing the pre-fabricated modules at a desired position, elements for (re-)building the route, e.g. a driving surface or driving way of the route, however, have to be installed on site.

It is a basic concept of the invention to use pre-fabricated or precast pavement slab assemblies which can be fabricated or casted off site, transported to a construction site, and then installed to provide a route.

SUMMARY OF THE INVENTION

In particular, a pavement slab assembly for a route for vehicles driving or standing on a surface of the route, in particular a route for road automobiles, is proposed. However, the present invention can be applied to a route for any land vehicle (including but not preferably, any vehicle which is only temporarily on land), in particular track-bound vehicles, such as rail vehicles (e.g. trams), but also to road automobiles, such as individual (private) passenger cars, trucks or public transport vehicles (e.g. busses including trolley busses which are also track-bound vehicles).

The pavement slab assembly consists at least partially of pavement material, e.g. concrete.

The pavement slab assembly comprises a cable bearing element adapted to position and/or to hold a plurality of line sections of one or more electric lines.

The cable bearing element can comprise recesses forming spaces and/or projections delimiting spaces for receiving at least one of the line sections. The electric line or lines can extend through these spaces. The electric line(s) extend(s) along and/or under the surface of the route, e.g. an (upper) surface of the pavement slab assembly. In particular, the electric line(s) can extend in and/or about the travelling direction of vehicles which are driving on the surface of the pavement slab assembly.

The cable bearing element can be formed as a shaped block which is described in GB 2485616 A. Therefore, the disclosure of GB 2485616 A is incorporated into the present description. In a preferred embodiment, which will be explained later, at least one end section of the cable bearing element can have a tapered or frustumed shape.

It may be possible to use as a pavement material the same type of material as the cable bearing element. The "same type of material" means that at least one component of the material is formed by the same chemical substance or by a similar chemical substance so that neighbouring regions of the same material have excellent surface contact or even form a common chemical compound. For example, this is the case with the material asphalt which contains bitumen (i.e. a type of hydrocarbons) as a component. Therefore, the cable bearing element and pavement material can consist of asphalt. However, the additional components of asphalt may vary, i.e. all types of asphalt contain bitumen, but may contain different additives (in particular stones).

Optionally, the pavement material can be different from the material of the cable bearing element. The materials, however, can be chosen such that a predetermined bonding force between the pavement material and the cable bearing element is provided.

The cable bearing element is embedded or encased in the pavement material of the pavement slab assembly. This means that the cable bearing element is integrated into the pavement slab assembly. Preferably, the cable bearing element is narrower (in the direction perpendicular to the travel direction) than a typical vehicle driving or standing on the route and therefore is also narrower than the pavement slab assembly. Therefore, the vehicle shields the environment against emission from the cable bearing element.

The pavement slab assembly can have an upper surface and a bottom surface which is located opposite to the upper surface. The upper surface of the pavement slab can provide a surface on which vehicles can travel, i.e. a driving surface, or on which the vehicle can park, i.e. a standing surface. Optionally, an additional layer can be placed on the upper surface providing the driving or standing surface.

The pavement slab assembly can be installed on a base layer which may be any suitable base layer. In particular, the base layer may be made of granular material, sand cement, lean concrete or roller compacted concrete. There may be plural base layers on top of each other. However, the base layer may be an existing base layer of a route which has been used by vehicles. In this case, for example at least one layer above the base layer, or at least a part of the layer(s) above the base layer can be removed from the existing route and the pavement slab assembly may be placed above or on the base layer. In this case, the bottom surface of the pavement slab assembly is placed on a surface of the base layer.

It is also possible that an intermediate layer is located between the base layer and the bottom surface of the pavement slab assembly. The intermediate layer can be used for decoupling the pavement slab assembly and the base layer from each other, in particular for decoupling vibrations and/or relative movement due to different thermal expansion/contraction. For example, the intermediate layer may be made of asphalt or, preferably, of grouting cement.

Furthermore, the intermediate layer can enhance embedding properties for the pavement slab assembly with respect to a surrounding. By the use of the intermediate layer, an embedding or integration of the pavement slab assembly onto the base layer and into a pavement structure can be improved.

Furthermore, the intermediate layer can provide a flat surface for the pavement slab assembly which provides a better support for said pavement slab assembly. Thus, a good surface matching between the base or intermediate layer and a surface of the pavement slab assembly is provided.

Such an intermediate layer reduces stress and, therefore, increases durability of the base layer and the pavement slab assembly.

The pavement slab assembly can be block-shaped. In this case, the pavement slab assembly has an upper surface, a bottom surface, and four side surfaces. Two of the side surfaces can extend in a longitudinal direction of the pavement slab assembly which can be the direction of travel of a vehicle on the driving surface of the pavement slab assembly. These side surfaces can be referred to as lateral surfaces, wherein the other two side surfaces face in longitudinal direction which can be referred to as front and rear surface.

The pavement block assembly can have a predetermined length, width, and depth. The width can e.g. be adapted to a desired with of a driving or standing surface, e.g. a traffic lane. For example, the pavement block assembly can have a length of 5 m to 6 m, a width of approximately 3 m, and a height up to 0.25 m.

According to the invention, the cable bearing element is arranged within the pavement slab assembly such that the cable bearing element is enclosed by the pavement material. The cable bearing element can, for example, be arranged within the pavement slab assembly such that the cable bearing element is fully enclosed by the pavement material.

The term "enclosed" means that the cable bearing element or an outer surface of the cable bearing element is disposed or positioned at a first (predefined) distance from the upper surface formed by the pavement slab assembly on the one hand and, on the other hand, disposed or positioned at a second (predefined) distance from the bottom surface formed by the pavement slab.

In this way, the electric line(s) guided by the cable bearing element are disposed at predefined distances from the surfaces of the pavement slab assembly.

The cable bearing element or an outer surface of the cable bearing element can also be disposed or positioned at (predefined) distances from the side surfaces, preferably the lateral surfaces, of the pavement slab assembly. It is, however, also possible, that the cable bearing element or an outer surface of the cable bearing element can also be disposed or positioned at (predefined) distances from the front surface and rear surface.

This means that pavement material is arranged between an upper outer surface of the cable bearing element and the upper surface of the pavement slab assembly. Also, pavement material is arranged between a bottom outer surface of the cable bearing element and the bottom surface of the pavement slab assembly. If applicable, pavement material is also arranged between lateral outer surfaces of the cable bearing element and the lateral surfaces of the pavement slab assembly. If further applicable, pavement material is also arranged between a front and rear outer surface of the cable bearing element and the front and rear surface of the pavement slab assembly respectively.

The term "enclosed", however, does not exclude the case wherein an outer surface of the cable bearing element facing a side surface of the pavement slab assembly which faces in the longitudinal direction (e.g. the front or rear surface) are not disposed or positioned at a distance to the corresponding surface. In this case, no pavement material is arranged between the front and rear outer surfaces of the cable bearing element and the front and rear surfaces of the pavement slab assembly and the front and rear outer surface of the cable bearing element form a part of the front and rear surface of the pavement slab assembly respectively. This allows an easier connection of the electric line(s) guided by the cable bearing elements if a plurality of pavement slab assemblies is arranged to build a route.

It does also not exclude the case wherein an end of an element attached to or connected to a main body of the cable bearing element, e.g. a spacing leg and/or a connecting element, is not disposed or positioned at a distance to the corresponding surface.

Furthermore, a filling element can be arranged in between two adjacent pavement slab assemblies, in particular in between a front surface of a first pavement slab assembly and a rear surface of another pavement slab assembly. In this case, said filling element can cover a front and/or a rear outer surface of the cable bearing element. The filling element can be a sealant. For example, the filling element can be a hot or cold mixture material or a preformed joint element.

With regard to a cross-section perpendicular to the longitudinal direction, e.g. a direction of travel of a vehicle driving on the driving surface of the pavement slab assembly, the term "enclosed" can be understood as that the cable bearing element is completely surrounded by the pavement material.

The cable bearing element is an integral part of the pavement slab assembly. It is positioned at a predetermined position within the pavement slab assembly such that an optimal transfer of electric energy to a vehicle travelling or standing on the surface formed by the pavement slab assembly is provided.

The cable bearing element can e.g. be positioned within a casting mould of the pavement slab assembly before casting of the pavement material. The casting mould can have a shape which corresponds to a shape of the cable bearing element, in particular to tapered- or frustumed-shaped end sections of the cable bearing element. This will be explained later. During the casting, the pavement material fills the space around the cable bearing element and voids around the electric line(s) within the cable bearing element. This results in a pavement slab assembly providing a one-piece pavement slab.

The pavement slab assembly comprises one or more armouring element(s). These armouring element(s) is/are used to reinforce the pavement slab assembly. The armouring element(s) is/are non-metallic armouring elements.

The proposed pavement slab assembly advantageously allows prefabricating the pavement slab assembly with elements allowing the transfer of electric energy to a vehicle by induction. Such a prefabricated pavement slab assembly only needs to be transported to a construction site and to be installed on e.g. a base layer. This way of building a route is particularly easy to perform. Since only a base layer needs to be provided, the time of installation can be reduced.

The proposed pavement slab assembly also ensures that the cable bearing element and therefore the electric line(s) are placed at a desired position with regard to a driving surface of a resulting route. In contrast to the modification of existing routes for placing the cable bearing elements, tolerances with regard to the position can thus be reduced which, in turn, enhances the transfer of electric energy.

As the cable bearing element or an outer surface of the cable bearing element is disposed or positioned at a first (predefined) distance from the upper surface formed by the pavement slab assembly on the one hand and, on the other hand, disposed or positioned at a second distance (predefined) from the bottom surface, the pavement slab assembly advantageously forms a self-supporting device which enhances a load bearing capacity of the pavement slab assembly, e.g. with respect to a traffic load.

The proposed pavement slab assembly therefore provides a precise positioning of the electric line(s) while also being capable to accommodate or absorb a desired traffic load.

As the cable bearing element is enclosed by the pavement material, a good protection of the guided electric line(s) e.g. against atmospheric influences, is advantageously provided.

The proposed pavement slab assembly allows integrating at least one electric line for transferring energy to a vehicle on a surface, e.g. driving surface or standing surface, of the pavement slab assembly. Energy can be transferred to the vehicle on the surface of the pavement slab assembly in a dynamic setting, e.g. when the vehicle drives or travels on the surface of the pavement slab assembly (dynamic transfer, e.g. dynamic charging). Energy can also be transferred to the vehicle on the surface of the route in a static setting, e.g. when the vehicles stands or parks on a surface of the route (static transfer, e.g. static charging). In the last case, the proposed pavement slab assembly can integrate a charging pad.

In a preferred embodiment, at least one end section of the cable bearing element has a tapered or frustumed shape. This means that the end section has the form of a frustum of a cone or a frustum of a pyramid. Preferably, both end sections of the cable bearing element have a tapered or frustumed shape. An end section of the cable bearing element denotes a section of the cable bearing element providing the aforementioned front or rear outer surface of the cable bearing element. Between both end sections of the cable bearing element, a middle section can be arranged. The middle section can have a block shape, e.g. a rectangular block shape.

Because of the tapered or frustumed shape of the end section(s), a width of a conductor arrangement comprising the electric line(s) which extend(s) through the spaces provided by the end section(s) of the cable bearing element decreases within end section(s) of the cable bearing element. In particular, a width of the conductor arrangement can decrease towards the aforementioned front or rear outer surface of the cable bearing element.

The electric line or lines which extend(s) through the spaces provided by the cable bearing element can have sections extending in the aforementioned longitudinal direction of the pavement slab assembly or in a longitudinal direction of the cable bearing element (longitudinal sections) and sections extending transverse to the longitudinal direction (lateral sections) of vehicles which are driving or standing on the route comprising the pavement slab assembly. In this case, the electric line(s) form a meandering conductor arrangement, i.e. extend along a meandering course of the electric line(s). In this case, a width of the conductor arrangement comprising the electric line(s) can be defined as a distance between two consecutive sections of an electric line which extend in the longitudinal direction, i.e. two consecutive longitudinal sections of the electric line, wherein these two consecutive sections are connected by a section of the electric line extending transverse to the longitudinal direction (lateral section). A width of a conductor arrangement comprising the electric line(s) which extend (s) through the spaces provided by the middle section of the cable bearing element can be constant.

The course of the electric line(s) guided by such a cable bearing element provides a primary winding capable of generating an electromagnetic field which enhances the inductive power transfer in a static setting, e.g. static charging. Having end sections of tapered or frustumed shape therefore advantageously provides a cable bearing element which allows to enhance or optimize a static charging of a vehicle parking or standing on the surface of the pavement slab assembly.

In another embodiment, the cable bearing element can be a one-piece element or comprise at least two subelements.

Having a one-piece element advantageously simplifies a construction of the cable bearing element.

The cable bearing element can comprise three subelements. A first subelement can provide a first end section, a second subelement can provide a middle section and a third subelement can provide a second end section. It is also possible that multiple subelements provide one of the aforementioned sections. If the cable bearing element comprises more than one subelement, these subelements can have connecting means for connecting the respective subelements in a correct manner. For example, the first subelement can have connecting elements adapted to corresponding first connecting elements of the second subelement. Correspondingly, the second subelement can have second connecting elements adapted to corresponding connecting elements of the third subelement. It is possible that subelements are force-fitted into each other, latched together, nested to each other or connected by any other detachable or non-detachable mechanical connection. Having more than one subelement advantageously enhances a transportability of the cable bearing element as the cable bearing element can be assembled on site, in particular at a slab production site or in a factory, and the subelements do not occupy a large construction space.

In another embodiment, the cable bearing element or at least one subelement of the cable bearing element has at least one void. A void can also be denoted as a blanking. Preferably, a base plate or a body of the cable bearing element or of the at least one subelement of the cable bearing element comprises at least one, preferably more than one, void. Additionally, the cable bearing element or at least one subelement of the cable bearing element, in particular the base plate or body, can have bars surrounding the void(s).

The at least one void can have a rectangular shape, in particular a rectangular shape with rounded edges. It is, however, possible that the at least one void can have a circular, a triangular, a hexagonal, an oval or another geometric shape.

The at least one void advantageously allows pavement material to flow through the void during the building of the pavement slab assembly. Additionally, the voids and, if applicable the bars, provide a stable but light-weight cable bearing element or subelement.

In another embodiment, the pavement slab assembly further comprises a non-metallic positioning element. The non-metallic positioning element ensures a fixed position of the cable bearing element before and during casting of the pavement material. In other words, the positioning element fixes or retains the cable bearing element in the predetermined position with regard to e.g. a casting mould during the casting process.

The cable bearing element and the positioning element are arranged such that the cable bearing element is positioned at a predetermined position within the pavement slab assembly. The positioning element and cable bearing element can be mechanically connected. The positioning element can e.g. be a spacer or spacer element. The positioning element can be arranged such that the cable bearing element or an outer surface of the cable bearing element is disposed or positioned at the aforementioned first distance from the upper surface and/or disposed or positioned at the aforementioned second distance from the bottom surface. The positioning element can e.g. be designed as a leg of the cable bearing element which extends from the cable bearing element to the bottom surface of the pavement slab assembly. Alternatively, the positioning element can be designed as a spacing layer which is placed between an outer surface of the cable bearing element and the bottom surface and/or upper surface of the pavement slab assembly. Also, the cable bearing element can comprise one or more fixing elements for fixing the cable bearing element to the positioning element.

The pavement slab assembly can comprise a plurality of positioning elements. After casting, the positioning element(s) can also be embedded within the pavement material of the pavement slab assembly.

The usage of non-metallic positioning elements advantageously allows retaining or fixing the cable bearing element before, during, and after the casting while electromagnetic properties of the electric line arrangement are not affected.

In another embodiment, the cable bearing element consists of a polymer. If the cable bearing elements comprises more than one subelement, each subelement can consist of a polymer.

The cable bearing element is preferably made of a high polymer. If the pavement material is concrete, the (high) polymer material advantageously provide strong bonding forces between the cable bearing element and the pavement material while a thermal expansion of the cable bearing element is small.

In a preferred embodiment, the positioning element is designed as an armouring element. In this case, the positioning element additionally reinforces the pavement slab assembly. Also, the positioning element provides reinforcement to the pavement slab assembly for lifting and transportation of the pavement slab assembly.

It is, for instance possible, to design the positioning element as an armouring mesh.

As the positioning element is a non-metallic element, the armouring element is also a non-metallic element. The armouring element can form a reinforcing structure of high tensile strength, e.g. an armour rod. Preferably, the armouring element is made of fibre glass. The armouring element can e.g. be a fibre glass rod or an arrangement of fibre glass rods.

It is possible that armouring elements form a reinforcement cage. This reinforcement cage can comprise a bottom layer made of a plurality of main bars and a plurality of cross bars, wherein the main bars extend in a direction of travel of a vehicle on the driving surface and a cross bar extends in a direction perpendicular to the direction of travel. It is, however, also possible that the mains bars and the cross bars intersect at an angle different than 90 degree and are non-perpendicular. Usually, a strength of the main bars is chosen to be higher than a strength of the cross bars, e.g. by having a larger diameter than a diameter of the cross bars. The respective size of the bars and the pavement requirements can result from a static design process. Also, the reinforcement cage can comprise a top layer made of a plurality of main bars and a plurality of cross bars. The top and bottom layers can prevent cracking in the pavement. A strength of the main bars and/or cross bars of the top layer is usually chosen to be smaller than the strength of the corresponding bars in the bottom layer. The bars of the bottom and of the top layer can be mechanically connected by U-bolts.

Before the casting, this reinforcement cage can be placed at the bottom of the casting mould. While a length and/or width of the reinforcement cage can be equal to or almost equal to a length and/or width of the pavement slab assembly, a height of the reinforcement cage can be smaller, e.g. a third or a half of the height of the pavement slab assembly.

The cable bearing element can be placed on the top layer of the reinforcement cage before and during casting. It is, however also possible that the cable bearing element is enclosed by the reinforcement cage before and during casting, wherein the top layer of the reinforcement cage is placed over the cable bearing element.

The cable bearing element can comprise one or more corresponding fixing elements for fixing the cable bearing element to the armouring element. It is, for example, possible that one or a plurality of main bars and/or cross bars, which form the bottom and/or the top layer of the reinforcement cage, extend or reach in or through a body of the cable bearing element. For this purpose, the cable bearing element can comprise one or more recesses, in particular bores, which form the aforementioned fixing elements. In this case, the armouring element also forms an anchor element for the cable bearing element.

The armouring element can also form a single armouring layer, e.g. made of main bars and/or cross bars or any other reinforcing elements.

The proposed assembly advantageously allows providing a durable pavement slab while reducing the complexity of positioning the cable bearing element within the pavement slab assembly.

In another embodiment, the assembly comprises at least one shielding element and/or one magnetic core element. The shielding element and/or one magnetic core element can be C-shaped or formed as a layer.

The shielding element can be made of electrically conducting material, e.g. aluminium. The shielding element shields an electromagnetic field produced by an electric line or by electric lines so that requirements concerning electromagnetic compatibility of EMC are met. For example, other electric lines or pipings may be buried in the ground below the route which need to be shielded against the electromagnetic field produced by the electric line(s).

The magnetic core element can be made of magnetic core material, e.g. ferrite. Within this description, "core" does not mean that the electric lines are wound around the core, but that magnetic field lines of the electromagnetic field produced by the electric lines are bundled within the core, i.e. the magnetic flux is particularly high within the core.

In particular, as mentioned above, the core space may extend in the driving direction of vehicles driving on the route and sections of the electric line(s) is/are preferably extending transversely to the extension of the core space. For example, the electric line or lines may follow a meandering path which extends in the direction of travel. The magnetic core element may alternatively be placed at another location within the route. It is possible that the cable bearing element comprises a recess forming a core space, wherein the magnetic core element can be placed into the recess. For example, a groove may extend on the upper side of the cable bearing element in the direction of travel of vehicles.

Particularly preferred is that there is a magnetic core element and, in addition, a shielding layer.

A positioning element, in particular a positioning element which forms an armouring element, can also be used to position or fix the shielding element and/or the magnetic core element. For this purpose, the shielding element and/or the magnetic core element can have corresponding fixing elements.

Alternatively or in addition, the cable bearing element can comprise one or more fixing elements for fixing the cable bearing element to the shielding element and/or magnetic core element. For example, the cable bearing element can comprise one or more receiving element(s), e.g. one or more recess(es), cut-out(s), or groove(s) to receive the shielding element and/or the magnetic core element.

In a preferred embodiment, the assembly comprises at least one shielding element and one magnetic core element, wherein the shielding element and the magnetic core element form a one-piece magnetic shielding element. The shielding element and the magnetic core element are designed as common element. In other words, they are formed integrally. The shielding element and the magnetic core element can be mechanically fixed to another so that there is a direct contact between the two elements.

The positioning element, in particular a positioning element which forms an armouring element, can also be used to position or fix the magnetic shielding element. For this purpose, the magnetic shielding element can comprise one or more fixing element, for example one or more recesses, e.g. bores, in or through which one or more positioning element(s), e.g. armouring rod(s), extend(s).

Alternatively or in addition, the cable bearing element can comprise one or more fixing elements for fixing the cable bearing element to the magnetic shielding element. For example, the cable bearing element can comprise one or more receiving elements, e.g. one or more recess(es), cut-out(s), or groove(s), to receive the magnetic shielding element.

The design of the magnetic shielding element as a one-piece element advantageously reduces the complexity of a fabrication process as the magnetic shielding element can be assembled and placed within a casting mould before the casting. As a result, only one element (instead of two elements) needs to be positioned or fixed within the pavement slab assembly.

In another embodiment, the magnetic shielding element is covered by a protective material. The protective material is preferably non-metallic and reduces or eliminates the risk of the aluminium corroding. The protective material can e.g. be epoxy or a bitumen type material.

In another embodiment, the shielding element and/or the magnetic core element, which are part of or form a first magnetic shielding element, is/are C-shaped. Preferably both, the shielding element and the magnetic core element which are part of or form the first magnetic shielding element are C-shaped. C-shaped means that the magnetic shielding element features a C-profile in a cross-section of the magnetic shielding element. In particular, the shielding element and the magnetic core element can be designed such that the magnetic core element can be arranged at least partially within the recess provided by the C-shaped shielding element.

Preferably, the pavement slab assembly comprises a first and a second magnetic shielding element, wherein the shielding elements and/or the magnetic core elements forming the first and the second magnetic shielding elements are C-shaped.

The first and the second magnetic shielding element are positioned such that the electric line(s) guided by the cable bearing element are located in a volume located between the first and the second magnetic shielding element, wherein the first and the second magnetic shielding element are facing each other. Facing each other means that the recesses formed by the C-shaped first and second magnetic shielding element are orientated towards each other.

It is, for example, possible that one or more part(s) of the electric line(s) are at least partially located within a volume comprised by the recess of the C-shaped first magnetic shielding element and/or one or more further part(s) are at least partially located within a volume comprised by the recess of the C-shaped second magnetic shielding element.

In an alternative embodiment, the shielding element and/or the magnetic core element, which are part of or form a first magnetic shielding element, is/are I-shaped. Preferably both, the shielding element and the magnetic core element which are part of or form the first magnetic shielding element are I-shaped. I-shaped means that the respective element can have a rectangular cross-section.

Preferably, the pavement slab assembly comprises a first and a second magnetic shielding element, wherein the shielding elements and/or the magnetic core elements forming the first and the second magnetic shielding elements are I-shaped.

The first and the second magnetic shielding element are positioned such that the electric line(s) guided by the cable bearing element are located in between the first and the second magnetic shielding element, in particular within a volume enclosed by the first and the second magnetic shielding element. The first and the second magnetic shielding element can extend in a vertical direction which means that a height of the element in said vertical direction is larger than a width in a lateral direction.

The first and the second magnetic shielding element can be e.g. positioned or placed next to or aside the electric line(s).

In this case, the magnetic shielding element(s) can be arranged such that the magnetic core element forms an inner part of the magnetic shielding element which is facing the cable bearing element while the shielding element forms an outer part of the magnetic shielding element.

If the magnetic shielding element is e.g. placed aside the cable bearing element, the magnetic core element forms an inner part of magnetic shielding element while the shielding element forms an outer part of the magnetic shielding element.

The cable bearing element can comprise one or more C-shaped or I-shaped recess(es) for receiving the first and/or second magnetic shielding element.

This advantageously allows to simultaneously shield an electromagnetic field while also guiding a magnetic flux.

In another embodiment, the shielding element and/or the magnetic core element, which are part of another magnetic shielding element, are designed such that the magnetic shielding element is formed as a layer. Preferably both, the shielding element and the magnetic core element are formed as a layer. In this case, the magnetic shielding element can be arranged such that the magnetic core element layer forms an inner part or inner layer of the magnetic shielding element which is facing towards the cable bearing element while the shielding element layer forms an outer part or outer layer of the magnetic shielding element which is facing away from the cable bearing element. If the layer is e.g. placed below the cable bearing element, the magnetic core element layer forms an upper layer of magnetic shielding element while the shielding element layer forms a bottom layer of the magnetic shielding element.

The layer can be e.g. a plate or a panel. The layer comprising a shielding element of electrically conducting material (for example aluminium) can be placed below the cable bearing element, e.g. between the bottom surface of the pavement slab assembly and a bottom outer surface of the cable bearing element.

If present, a shielding layer shields the electromagnetic field produced by an electric line or lines so that requirements concerning electromagnetic compatibility of EMC are met.

The cable bearing element can comprise a recess, a cut out or a groove for receiving the layer such that the layer is located at a fixed distance to the electric line(s) which is constant also during the casting.

Alternatively, the positioning element, in particular a positioning element which forms an armouring element, can also be used to position or fix the layer. For this purpose, the layer can comprise one or more fixing elements for fixing the layer to the positioning element. The layer can comprises for example recesses such as bores, in or through which one or more positioning element(s), e.g. armouring rod(s), extend (s).

The layer can also be positioned within the pavement slab assembly by using spacers such that the layer is located at a fixed distance to the electric line(s) and at a fixed distance to a surface or at fixed distances to surfaces of the pavement slab assembly.

The design as a layer advantageously allows shielding an area behind or below the layer (with respect to the cable bearing element) while also guiding a magnetic flux.

In another embodiment, the magnetic shielding element comprises at least one non-metallic anchorage element. The anchorage element can be mechanically connected to the magnetic shielding element and advantageously enhances a bonding of the pavement material to the magnetic shielding element.

In another embodiment, the assembly further comprises a detection assembly for detecting a vehicle to be charged.

The detection assembly can be designed such that a presence of a vehicle can be detected. Alternatively, the detection assembly can be designed such that a presence of a predetermined vehicle or class of vehicles can be detected. For example, the detection assembly can receive a coded signal, wherein the code contains information on which vehicle or type of vehicle has sent the signal. If a vehicle enters a detection or receiving area of the detection assembly, the presence of the vehicle is detected by the detection assembly and an output signal can be generated. The detection area is e.g. an area in which signals can be received by the detection assembly, e.g. an area of 10 m or 20 m around the detection assembly. The output signal can be used for route surveillance and/or to initiate the transfer of electric energy to consecutive sections of electric line(s) (primary windings) in the direction of travel to the vehicle. This advantageously allows activating an energy transfer, e.g. supplying electric energy, to electric line(s) only if they are to be passed over by the vehicle.

Preferably, an inductive receiver is used for the reception of the signal sent by the vehicle which does not only receive the signal but also generates a voltage to power the detection assembly. For example, a RFID-device can be used.

The detection assembly can comprise a conductor loop which is arranged in an area adjoining to the area in which the cable bearing element is located. The conductor loop can be arranged at the same height as the electric line(s) forming the primary winding with respect to a bottom surface of the pavement slab assembly. Preferably, the conductor loop can be arranged higher as the electric line(s) forming the primary winding with respect to a bottom surface of the pavement slab assembly, e.g. closer to the driving surface provided by the pavement slab assembly. It is desirable that the detection assembly avoids the armouring elements. Therefore, it can be arranged either above a top layer of the armouring elements or below a bottom layer of the armouring elements.

The detection assembly can be arranged aside the cable bearing element, e.g. at a fixed distance to the cable bearing element (or an outer surface of the cable bearing element) in a direction perpendicular to the direction of travel.

The detection assembly can be placed after the pavement material has cured, whereby slots are cut into a driving surface of the pavement slab assembly and the detection system is placed into the slot and filled with a sealant afterwards. This provides a simple method of installing induction loops in the proposed pavement slab assembly which can be arranged e.g. at traffic lights or automatic gates in a carpark. A terminal or terminals of the detection assembly can be arranged on a side surface of the pavement slab assembly, preferably at one of the aforementioned lateral surfaces.

The positioning element, in particular a positioning element which forms an armouring element, can also be used to position or fix the detection assembly or at least a part of it. For this purpose, the detection assembly can comprise one or more fixing or clamping elements for fixing the detection assembly to the positioning element. Alternatively, a specially shaped element can be used in which the detection assembly or a part of it, e.g. a detection loop, can be placed. This shaped element serves as a carrying element. Consequently, the carrying element can be fixed by the positioning element.

In another embodiment, the assembly comprises at least one feeder line for providing electric energy to at least one electric line, wherein the feeder line is at least partially shielded by a shielding conduit. If the area around the feeder line is free of cables and metal pipes the shielding can be omitted. The shielding conduit can be made of aluminium. The feeder line provides an electric connection of the electric line(s) guided by the cable bearing element to an external power supply. The feeder line can e.g. be arranged such that the feeder line is led through a side surface of the pavement slab assembly, preferably through one of the aforementioned lateral surfaces.

This advantageously allows meeting requirements concerning electromagnetic compatibility.

In another embodiment, the pavement slab assembly comprises a lifting element for lifting the pavement slab assembly. The lifting element can be a lifting eye, a clamp, a bracket, a bolt, a U-bolt or another device which allows lifting and transporting the complete pavement slab assembly after casting.

In a preferred embodiment, the lifting element is designed as a non-metallic carrier element which protrudes from a surface of the assembly. Preferably, the non-metallic carrier element protrudes from a side surface, for example from one or both of the aforementioned lateral surfaces, of the pavement slab assembly. It is, however, also possible that the non-metallic carrier element protrudes from a front and/or a rear surface, especially when using precast concrete lifting devices. The non-metallic carrier element can be a non-metallic anchorage bar.

It is also possible that the lifting element, e.g. the non-metallic carrier element, is formed as a part of the aforementioned positioning element. If the positioning element is also designed as an armouring element, the lifting element, e.g. the non-metallic carrier element, is formed as a part of the aforementioned armouring element. The lifting element can e.g. be an anchorage bar which also forms a crossbar of the aforementioned reinforcement cage. In this case, one end or both ends of the crossbar can protrude from the side surfaces of the pavement slab in order to provide the lifting elements.

This advantageously allows simple lifting and transporting from e.g. a fabrication site to a construction side.

Furthermore, a route for vehicles driving or standing, e.g. parking, on a surface of the route, in particular for road automobiles, is proposed. The route comprises a plurality of pavement slab assemblies according to the previous description. The pavement slab assemblies are arranged with respect to another such that a driving or standing surface for vehicles is provided. The term "route" denotes one or more sections of the ground providing a driving surface or standing surface for vehicles. Thus, the term route also comprises the ground of a e.g. parking lot or a garage.

A route made of the proposed pavement slab assemblies may comprise gaps between consecutive pavement slab assemblies of the route in the direction of travel, wherein the gaps extend perpendicular to the direction of travel and allow relative movement between the consecutive pavement slab assemblies of the route due to movement of the underground and/or due to thermal expansion and contraction. Typically, these gaps are filled by elastically deformable material.

In this case, at least one of these gaps can coincide with a gap of consecutive cable bearing elements which are part of a line of consecutive cable bearing elements extending in the direction of travel of the route. Furthermore, the electric line or electric lines which are received by spaces of the consecutive cable bearing elements can extend across the gap between the consecutive pavement slab assemblies of the route and/or the gap between consecutive cable bearing elements. For this purpose, an additional electric connection can be made at the gap which connects different electric lines, for example electric connectors or soldered electric connections.

In addition, the electric line or lines preferably have a continuous outer layer forming an electric insulation. In this case, an additional connection of the insulation can be used to connect insulations of electric lines of consecutive pavement slab assemblies. Since electric lines, including their insulation, are typically elastically deformable to some extent, the electric lines extending across the gap deform in a corresponding manner to the extension or compression of the gap.

Furthermore, method of building a pavement slab assembly is proposed, wherein the following steps are performed:
  providing a casting mould,
  providing a cable bearing element for positioning and/or holding a plurality of line sections of one or more electric lines,
  laying the electric line or lines so that it/they extend(s) along and/or under the surface of the route or an upper surface of the pavement slab assembly,
  arranging the cable bearing element within the casting mould,
  casting pavement material into the casting mould, wherein the cable bearing element is arranged such that the cable bearing element is enclosed by the pavement material.

The cable bearing element can comprise recesses forming spaces and/or projections delimiting spaces for receiving at least one of the line sections. The electric line(s) can be laid so that it/they extend(s) through the spaces.

In particular, the electric line(s) can extend in and/or about the travelling direction of vehicles which are driving on the route comprising the pavement slab assembly.

The cable bearing element can be arranged within the casting mould such that a position of the cable bearing element does not change during the casting process. It is possible to use fibre concrete as a pavement material.

This method advantageously allows fabricating the pavement slab assembly off site providing a precast pavement slab assembly.

In another embodiment, the following step is additionally performed:
  providing a non-metallic positioning element
  arranging the cable bearing element and the positioning element such that the cable bearing element is enclosed by the pavement material after casting.

The positioning element is used to position the cable bearing element within the casting mould such that the cable bearing element is enclosed by the pavement material after casting.

The non-metallic positioning element advantageously allows keeping the cable bearing element in a fixed position during pouring of the pavement material around the components.

Furthermore, one or more of the following steps can additionally be performed:
  providing and arranging a magnetic shielding element,
  covering the magnetic shielding element with a protective material,
  providing and arranging a detection assembly for detecting a vehicle,
  providing and arranging a shielding conduit for an electric line,
  providing and arranging a lifting element for lifting the pavement slab assembly.

Preferably, all additional elements of the pavement slab assembly such as a magnetic shielding element and/or a detection loop assembly and/or a shielding conduit and/or a lifting element can be arranged within the casting mould before casting. Positioning elements can be used to keep these elements in a fixed position during pouring of the pavement material around the components.

Alternatively, in particular with respect to the detection assembly, it is possible to first cast pavement material into the casting mould and arrange or place the elements after the pavement material has cured. This can require the steps of removing one or more areas from the casted pavement slab assembly, to fit in the desired element, and to fill remaining spaces with a suitable material to protect the inserted element. The material, however, should be chosen such that a durability of the pavement slab assembly is not adversely affected by the later installation.

It is also possible to provide a carrying element for each of the additional elements wherein the carrying element is designed to receive the respective additional element. In this case, the carrying element has to be arranged within the casting mould. As the cable bearing element, the carrying element can be made of a material which provides a predetermined bonding force between the pavement material and the carrying element after casting.

It is also possible to assemble the electrical components, e.g. the electric line(s) forming the primary winding and, if applicable, the detection assembly, in a location where testing and calibration of the electric system can be carried out and then transport the assembly to another location for the completion of the slab casting process with the pavement material. For transporting all elements of the pavement slab assembly to a casting site, special carrying devices can be provided. For example, a rigid carrier system specially developed for lifting and transporting the cable bearing element including the electric line(s) and, if applicable, the magnetic shielding element(s) can be used. The elements can e.g. be braced with a rigid lifting support. If not integrated in the cable bearing element, the magnetic shielding element(s) can also require a rigid lifting device.

Before casting, a final testing procedure should be conducted to ensure a correct function of all elements, especially the electric elements.

The proposed method advantageously allows building of a pavement slab assembly with a high durability with respect to traffic load, wherein an accurate positioning of, in particular, electric elements such as the electric line(s) forming the primary winding is ensured.

Furthermore, a method of building a route for vehicles driving or standing on a surface of the route, in particular for road automobiles, wherein the following steps are performed is proposed:
- providing a plurality pavement slab assemblies according to the previous description,
- installing the pavement slabs assemblies on a prepared base or foundation such that a driving surface for vehicles which are driving on the route is provided.

The pavement slab assemblies can be fabricated off site. Furthermore, the pavement slab assemblies can be lifted and transported by means of lifting devices, e.g. lifting eyes integrated into the pavement slab assemblies to a construction site. The base or foundation can be prepared prior to the delivery of the pavement slab assemblies and shall meet the pavement foundation design requirements. During building the route, the slab may need to be leveled by injecting a resin or grout underneath the pavement slab to provide a solid, void-free boundary under the slab and a surface of the pavement slab which matches the design levels of the road and surrounding pavement.

The proposed method advantageously allows building of a route with a high durability which provides a high quality of inductive energy transfer using prefabricated pavement slab assemblies. This allows reducing an installation time.

BRIEF DESCRIPTION OF THE DRAWINGS

Examples and preferred embodiments of the invention will be described with reference to the attached figures which show.

DETAILED DESCRIPTION OF THE INVENTION

Figure 1:
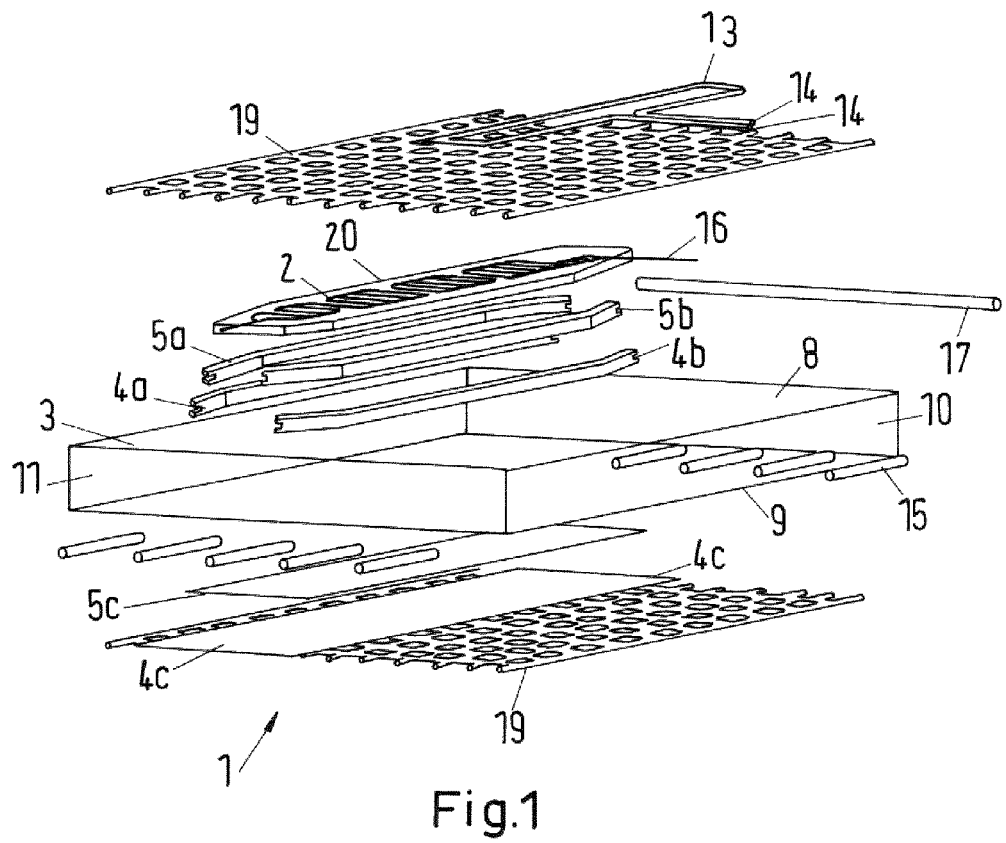
FIG. 1 an exploded view of a pavement slab assembly.

FIG. 1 shows an exploded view of a pavement slab assembly 1. The pavement slab assembly 1 comprises a cable bearing element 20 (see e.g. FIG. 5) adapted to hold a plurality of line sections of electric lines 2 forming a primary winding of an arrangement for inductive power transfer. The cable bearing element 20 and consequently the electric line(s) 2 are embedded and arranged within pavement material 3 such that the cable bearing element 20 is enclosed by pavement material 3.

The pavement slab assembly 1 further comprises a first C-shaped shielding element 4a, a second C-shaped shielding element 4b, and a third shielding element 4c which is designed as a shielding plate. Also, the pavement slab assembly 1 comprises a first C-shaped magnetic core element 5a, a second C-shaped magnetic core element 5b, and a third magnetic core element 5c which is designed as a plate.

The first C-shaped shielding element 4a and the first magnetic core element 5a form a first one-piece magnetic shielding element. Also, the second C-shaped shielding element 4b and the second magnetic core element 5b form a second one-piece magnetic shielding element.

The first and the second magnetic shielding element are positioned aside the cable bearing element 20 such that the electric lines 2 are located in a volume located between the first and the second magnetic shielding element. The first and the second magnetic shielding element are facing each other, wherein facing each other means that the recesses 7 (see FIG. 2) formed by the C-shaped first and second magnetic shielding element are orientated against each other.

The magnetic core elements 5a, 5b form inner parts of the magnetic shielding elements while the shielding elements 4a, 4b form outer parts of the magnetic shielding elements.

The magnetic shielding element consisting of the magnetic core element 5c and the shielding element 4c is placed below the cable bearing element 20. The magnetic core element 5c forms an upper layer of magnetic shielding element while the shielding element 4c forms a bottom layer of the magnetic shielding element.

In FIG. 1 is shown that the pavement slab assembly 1 is block-shaped. The pavement slab 1 has an upper surface 8, a bottom surface 9, and four side surfaces. Two of the side surfaces extend in the direction of travel of a vehicle on a driving surface of the pavement slab assembly 1 and are referred to as lateral surfaces 10. The other two side surfaces face in the direction of travel and are referred to as front surface 11 and rear surface 12 (see e.g. FIG. 3). The upper surface 8 forms the driving surface of a route comprising the pavement slab assembly 1.

Furthermore, the pavement assembly 1 comprises a detection loop 13 which is part of a detection assembly. The detection loop 13 is arranged in an area adjoining to the area in which the cable bearing element 20 is located. The detection loop 13 is arranged at a higher level than the electric lines 2 (see FIG. 2) with respect to the bottom surface 9 of the pavement slab assembly 1. Terminals 14 of the detection loop 13 are arranged on a lateral surface 10 of the pavement slab assembly 1.

The pavement slab assembly 1 also comprises non-metallic dowel bars 15. To simplify matters, only one dowel bar 15 is denoted by a reference numeral. The dowel bars 15 can allow lifting and transporting the complete pavement slab assembly 1 after casting. It is also possible to integrate lifting means such as a lifting eye, a clamp, a bracket, a bolt, and/or a U-bolt. These lifting means can be connected to reinforcement elements 19 of the pavement slab assembly. It is also possible to connect a metal rope to the reinforcement elements 19 to lift the pavement slab assembly 1. In this case, a tube, e.g. a plastic tube, can be integrated in the pavement slab assembly 1 before casting such that the metal rope can be inserted into the tube after the pavement material has cured in order to be connected to the reinforcement elements 19. The dowel bars 15 protrude from the front surface 11 and the rear surface 12 of the pavement slab assembly 1. The dowel bars 15 on the front and rear surface 11, 12 are specially designed for load transfer when a vehicle passes from one pavement slab assembly 1 to the next in the direction of travel of the vehicle. Dowel bars 15 are therefore used to connect consecutive different pavement slab assemblies which are adjacent in the direction of travel.

It is also possible that anchorage bars protrude from the lateral surfaces 10. The anchorage bars can be used to connect different pavement slab assemblies 1 which provide adjacent traffic lanes of a route. When two adjoining lanes are built with separate pavement slab assemblies 1, the joint between the two pavement slab assemblies 1 is called a longitudinal construction joint. With reference to FIG. 1, the longitudinal construction point is built by a lateral surface 10 of a first pavement slab assembly 1 and a lateral surface of a neighboring or adjacent pavement slab assembly (not shown). An anchorage bar, for example a short piece of non-metallic material, can extend across such a longitudinal construction joint. Such anchorage bars keep the two adjoining pavement slab assemblies from pulling away from each other, hold the facing lateral surfaces of two pavement slab assemblies in contact and keep the surface across the construction joint flat. Hence, its function is different from the function of the dowel bars 15. An anchorage bar can be a deformed, preferably non-metallic, reinforcing element or a connector and should be designed and/or arranged such that respective construction joint does not open. Anchorage bars can be used to separate lanes for heavy traffic ways pavements. Also, anchorage bars can be designed in order to provide a load transfer element. Anchorage bars are typically used at longitudinal joints or between an edge joint and a curb or shoulder. Anchorage bars are therefore used to connect consecutive different pavement slab assemblies which are adjacent in a direction perpendicular to the direction of travel.

The dowel bars 15 and/or the anchorage bars can be part of reinforcement elements 19 of the pavement slab assembly 1.

FIG. 1 shows that the pavement slab assembly 1 comprises feeder lines 16 for providing electric energy to the electric lines 2. The electric lines 2 are connected at a star point (not shown), wherein the feeder lines 16 can be connected to e.g. a wayside power supply. In one embodiment, one feeder line 16 per electric line 2 is provided, e.g. six feeder lines 16 for six electric lines 2. To simplify the connection of the electric lines 2, a length of the electric lines 2 is chosen such that the electric lines 2 only extend in the direction of travel through one pavement slab assembly 1. The feeder lines 16 are shielded by a shielding conduit 17. The feeder lines 16 provide an electric connection of the electric lines 2 to an external power supply (not shown). The feeder lines 16 and the shielding conduit 17 are arranged such that the feeder lines 16 are led through a lateral surface 10 of the pavement slab assembly 1. It is, however, also possible that the feeder lines 16 exit the pavement slab assembly 1 at the front or rear surface 11, 12 or at the upper or bottom surface 8, 9.

Further, the pavement slab assembly 1 comprises non-metallic reinforcement elements 19 which are designed as an armouring mesh and also for lifting the pavement slab for transport and installation. This will be explained later. The non-metallic reinforcement elements 19, in particular the non-metallic reinforcement element 19 which is arranged below the cable bearing element 20, can provide (a) non-metallic positioning element(s), wherein the cable bearing element 20 and the positioning element(s) are arranged such that the cable bearing element 20 is positioned at a predetermined position within the pavement slab assembly 1. The non-metallic reinforcement elements 19 and the cable bearing element 20 can be mechanically connected. Thus, the non-metallic reinforcement elements 19 can fix or retain the cable bearing element 20 in the predetermined position with regard to e.g. a casting mould during the casting process.

Figure 2:
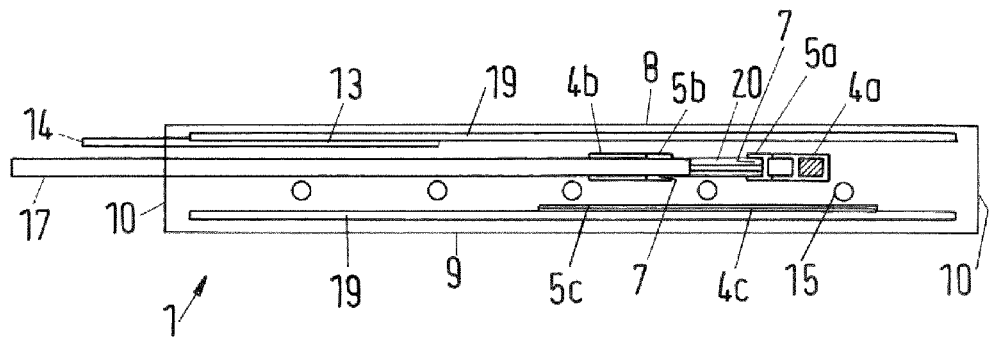
FIG. 2 a cross section through the pavement slab assembly shown in FIG. 1.

FIG. 2 shows a cross section through the pavement slab assembly 1 shown in FIG. 1. FIG. 2 illustrates the height level in which the respective elements are arranged with respect to the bottom surface 9 of the pavement slab assembly 1. For example, the magnetic shielding element comprising the shielding element 4c and the magnetic core element 5c is located below the electric lines 2. Also shown is that the electric lines 2 are partially located within a volume comprised by the C-shaped first magnetic shielding element, e.g. the volume comprised by the recess 7 of the first C-shaped magnetic core element 5a and that the electric lines 2 are also partially located within a volume comprised by the C-shaped second magnetic shielding element, e.g. the volume comprised by the recess 7 of the second C-shaped magnetic core element 5b.

Figure 3:
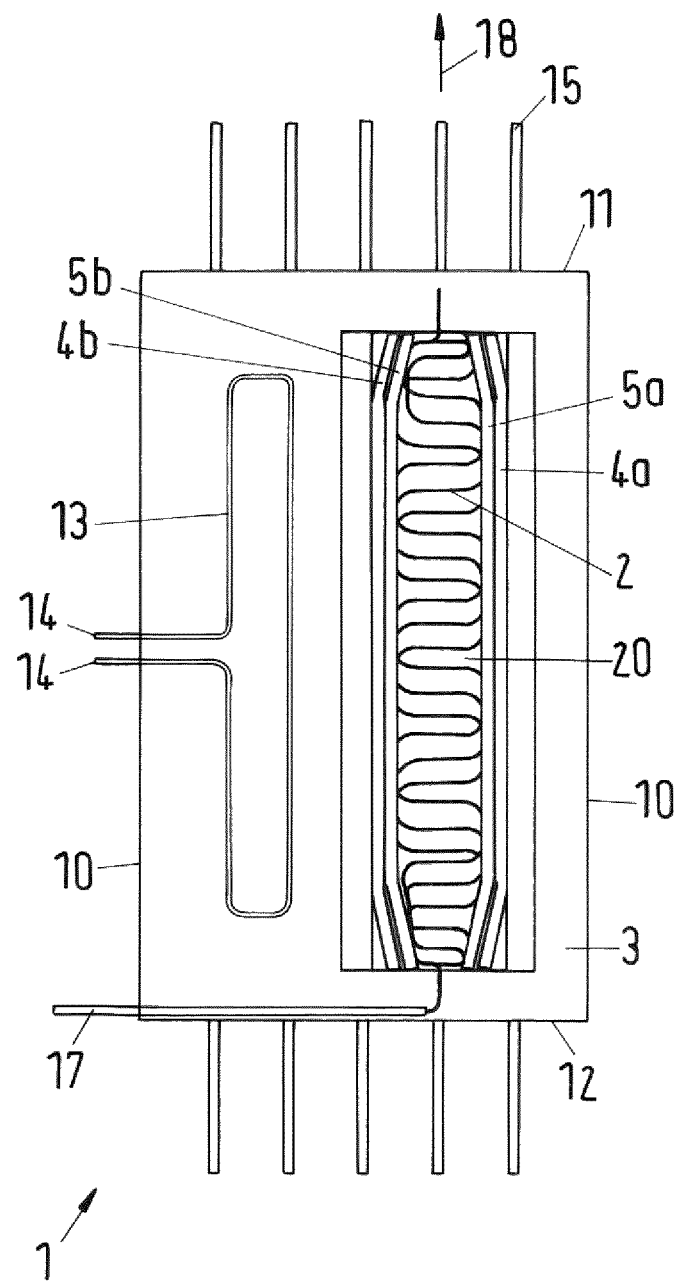
FIG. 3 a top view of the pavement slab assembly shown in FIG. 1.

FIG. 3 shows a top view of the pavement slab assembly 1 shown in FIG. 1. It is shown that the detection loop 13 is placed in an area adjoining to the area in which the electric lines 2 are located. In FIG. 3, a direction of travel of vehicles driving on the driving surface of the pavement slab assembly 1 is indicated by an arrow 18.

To build a route, a plurality of pavement slab assemblies 1 can be arranged adjacent to one another in the direction of travel and adjacent to each other in the direction perpendicular to the direction of travel. With respect to the direction of travel, a front surface 11 of a first pavement slab assembly 1 faces a rear surface 12 of a consecutive pavement slab assembly 1.

Figure 4:
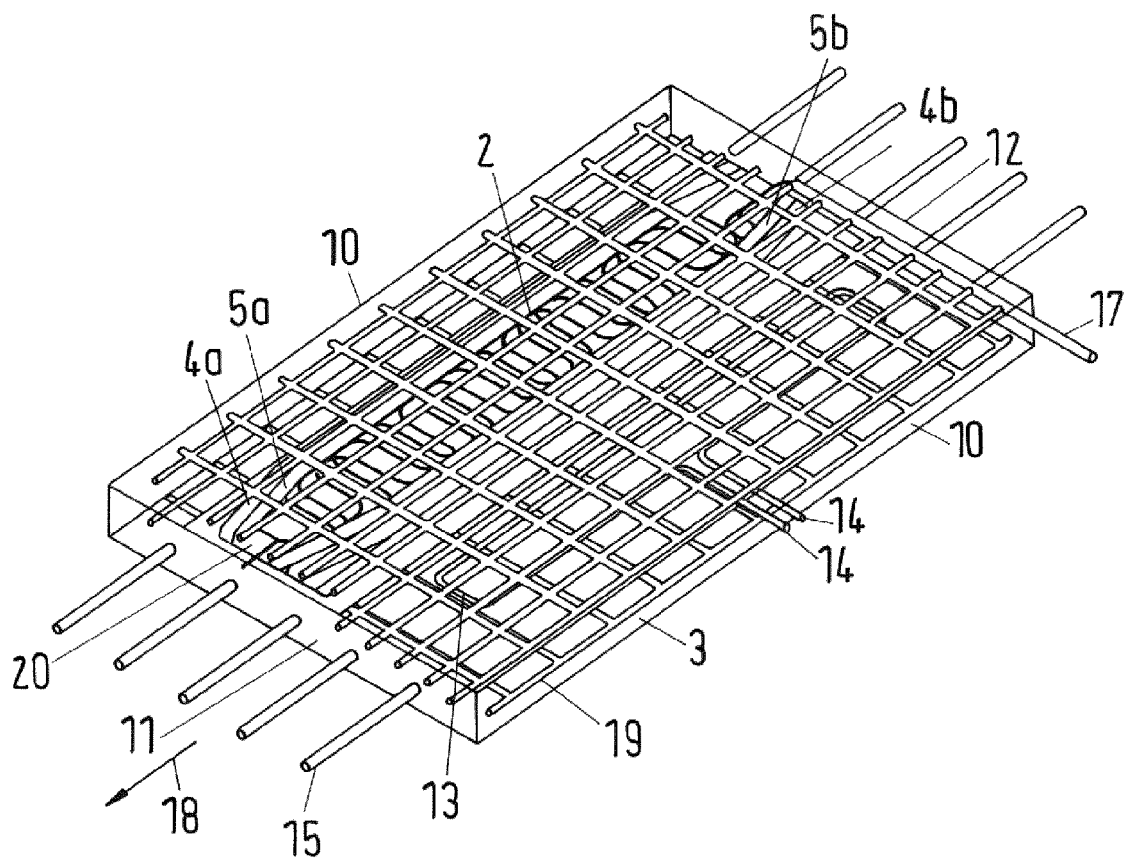
FIG. 4 a perspective view of the pavement slab assembly shown in FIG. 1.

FIG. 4 shows a perspective view of the pavement slab assembly 1 shown in FIG. 1. It is shown that the non-metallic reinforcement elements 19 are designed as armouring meshes located above and below the cable bearing element 20. The armouring mesh provides a reinforcing structure of high tensile strength and can be made of fibre glass. Each armouring mesh comprises a plurality of main bars and a plurality of cross bars, wherein the main bars extend in a direction of travel (see arrow 18) of a vehicle on the driving surface and the cross bars extend in a direction perpendicular to the direction of travel. More generally, the main bars extend in a longitudinal direction of the pavement slab assembly 1 (which can be equal to the direction of travel) and the cross bars extend in a lateral direction of the pavement slab assembly 1 which is perpendicular to the longitudinal direction.

Figure 5:
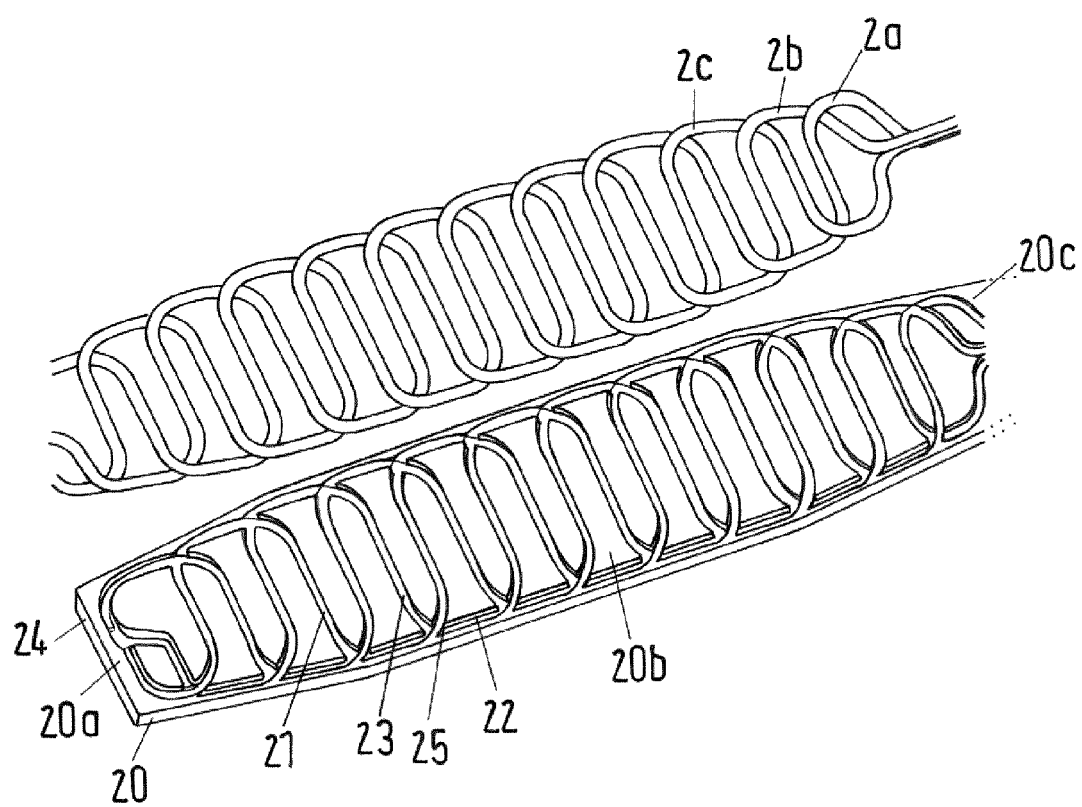
FIG. 5 a perspective view of a cable bearing element and electric lines.

FIG. 5 shows a perspective view of a cable bearing element 20 which comprises a number of recesses 21, wherein longitudinal sections 22 of the recesses 21 extend in a longitudinal direction of the cable bearing element 20 and lateral sections 23 of the recesses 21 extend in a lateral direction of the cable bearing element 20. The lateral sections 23 extend perpendicular to the longitudinal sections 22. The longitudinal direction of the cable bearing element 20 can be equal to the longitudinal direction (see arrow 18 in FIG. 4) of the pavement slab assembly 1. The cable bearing element 20 can be made of polymer.

Also shown are electric lines 2a, 2b, 2c which can be received by the recesses 21. The recesses 21 are parallel to each other and are arranged within the same horizontal plane. If placed into the recesses 21, the electric lines 2a, 2b, 2c form a meandering conductor arrangement, i.e. extend along a meandering course of the electric lines 2a, 2b, 2c.

End sections 20a, 20c of the cable bearing element 20 have a frustumed shape. Between both end sections 20a, 20c of the cable bearing element 20, a middle section 20b can be arranged. The middle section 20b can have a block shape, e.g. a rectangular block shape.

Because of the frustumed shape of the end sections 20a, 20c, a width of a conductor arrangement comprising the electric lines 2a, 2b, 2c decreases towards a front outer surface 24 and a rear outer surface (not shown) of the cable bearing element 20.

A width of the conductor arrangement comprising the electric lines 2a, 2b, 2c is defined as a distance between two consecutive longitudinal sections 22 of an electric line 2a, 2b, 2c, wherein these two consecutive longitudinal sections 22 are connected by a lateral section 23 of the electric line 2a, 2b, 2c. Thus, a width of the conductor arrangement at the front outer surface 24 and the rear outer surface is smaller than a width of the conductor arrangement in the middle section 20b.

Each recess 21 has a double U-shaped cross-section to receive electric lines 2a, 2b, 2c which can be provided by a cable. This will be explained later with regard to FIG. 7. A transition between a lateral section 23 of a recess 21 and a consecutive longitudinal section 22 of the recess 21 is provided by a curved section 25 of the recess 21. Electric lines 2a, 2b, 2c can be laid in a manner consecutively extending from the longitudinal section 22 through the curved recess section 25 into the lateral section 23, thereby changing the direction of extension from parallel to the direction of travel to perpendicular to the direction of travel (if the longitudinal direction corresponds to the direction of travel).

Figure 6:
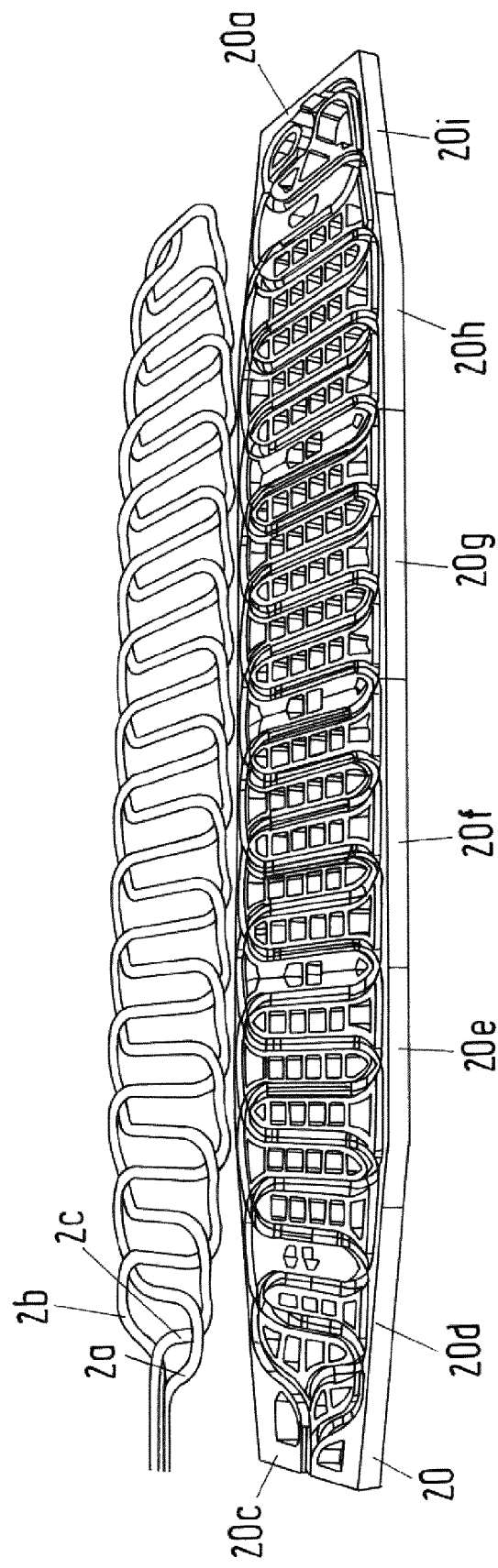
FIG. 6 a perspective view of a cable bearing element comprising multiple subelements and electric lines, FIG. 7 a perspective view of a subelement of a cable bearing element, FIG. 8 a perspective view of a another embodiment of a cable bearing element, which can be used as a support element for supporting electric lines, in particular cables, FIG. 9 a top view of the cable bearing element shown in FIG. 8, and FIG. 10 a vertical cross-section through half of the block of FIGS. 8 and 9.

FIG. 6 shows a perspective view of a cable bearing element 20 and electric lines 2a, 2b, 2c. The cable bearing element 20 comprises multiple subelements 20d, 20e, 20f, 20g, 20g, 20h, 20i. The subelements 20d, 20e, 20f, 20g, 20g, 20h, 20i are mechanically connected to each other in order to provide the cable bearing element 20. The connection can be a detachable or undetachable connection, for example a latching connection.

The subelements 20d, 20e, 20f, 20g, 20g, 20h, 20i provide different sections of the cable bearing element 20. For example, the subelement 20i provides the end section 20a, the subelement 20d provides the end section 20c and the subelements 20e, 20f, 20g, 20h provide the middle section 20b (see FIG. 5).

Figure 7:
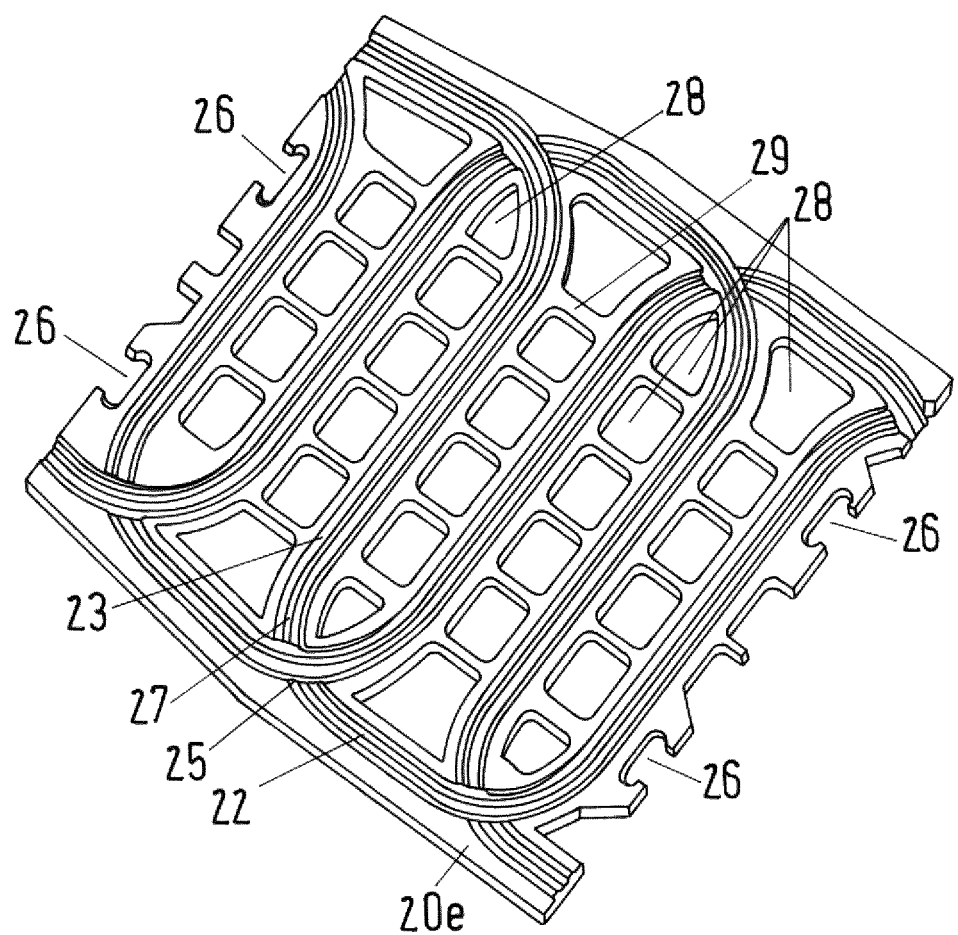

FIG. 7 shows a perspective view of the subelement 20e of a cable bearing element 20 shown in FIG. 6. The subelement 20e shown is a subelement providing a transition element between a middle section 20b of a cable bearing element 20 (see FIG. 5) and an end section 20c of the cable bearing element 20. It is shown that the subelement 20e has recesses 26 for providing a dovetail connection to consecutive subelements 20d, 20f. The subelement 20e provides a part of the longitudinal sections 22, curved sections 25, and lateral sections 23 shown in FIG. 5. It is shown that the sections 22, 23, 25 have a double U-shaped cross-section. Thus, a section 22, 23, 25 has two endwalls and a centre bar or centre divider 27. This configuration provides two adjacent guiding channels for e.g. cables. Thus, two neighbouring cables can be received by the sections 22, 23, 25, wherein the two neighbouring cables provide one electric line 2a, 2b, 2c. This increases a magnitude of an electromagnetic field generated by a current flowing through the electric lines 2a, 2b, 2c. Also shown is that a base plate or body of the subelement 20e has blankings 28 and bars 29 surrounding the blankings 28 in order to provide a stable but light-weight subelement 20e. The other subelement 20d, 20f, 20g, 20h, 20i shown in FIG. 6 can be designed correspondingly.

During the building of the pavement slab assembly, pavement material, e.g. concrete, can flow through the free spaces in the cable bearing element 20. Free spaces, e.g. the blankings 28, allow material to flow through while providing a light weight cable bearing element 20. The centre divider 27, the blankings 28 and the bars 29 give strength to the cable bearing element 20 when it is positioned in the pavement slab assembly 1 and during cable installation.

Figure 8:
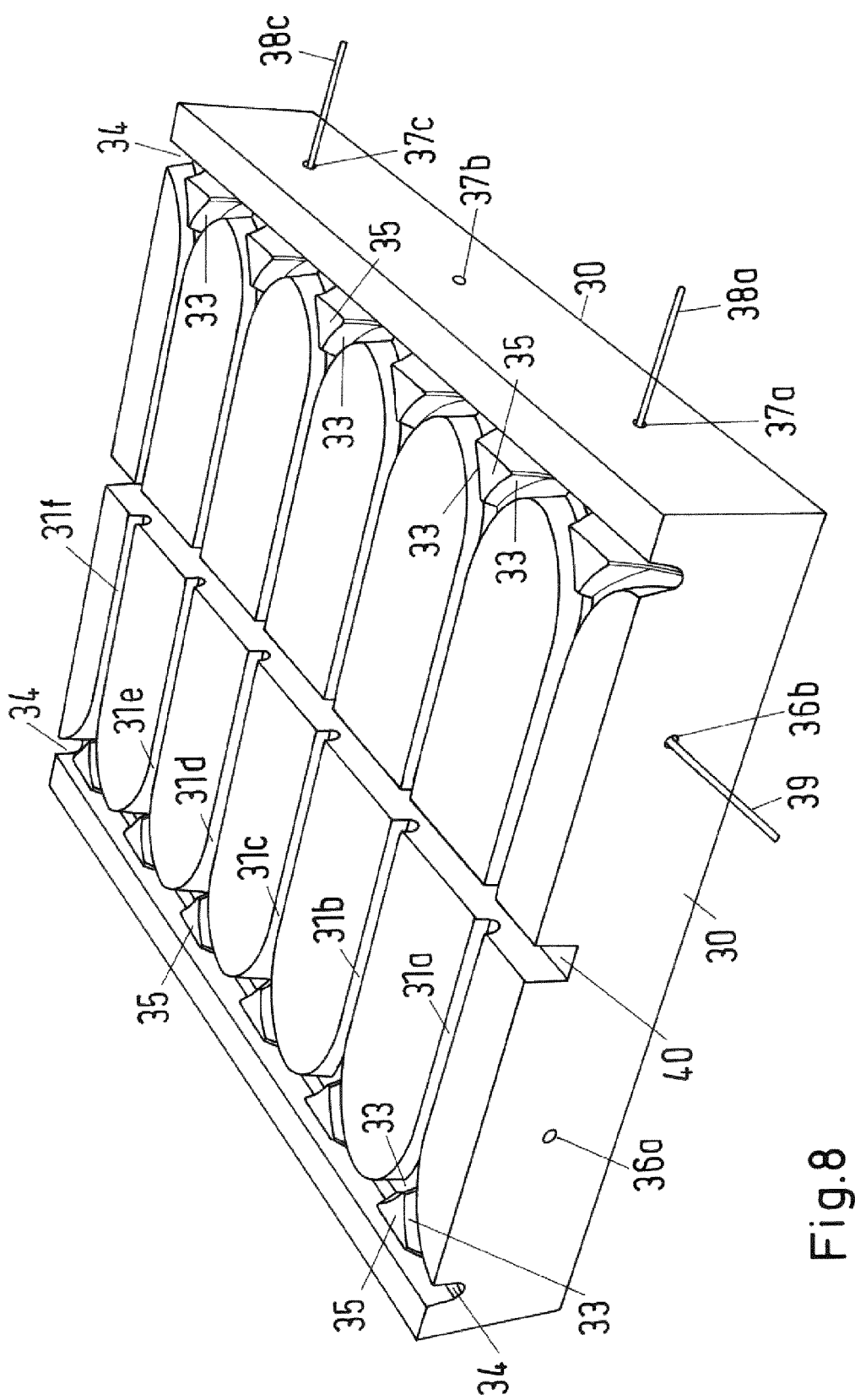
Figure 9:
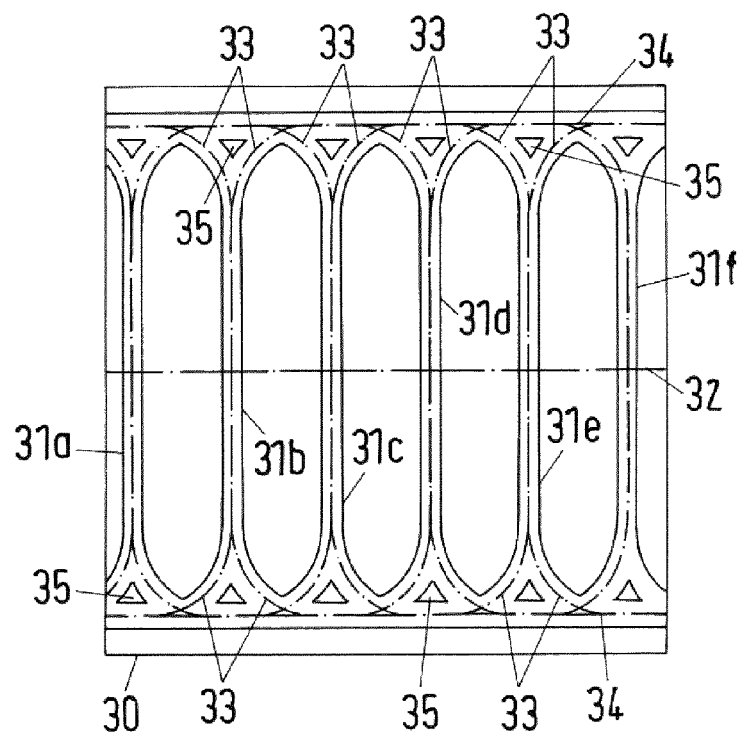

FIG. 8 shows a perspective view of a cable bearing element 30 and FIG. 9 shows a top view of the cable bearing element 30, which comprises six recesses 31a-31f extending perpendicularly to a centre line 32 which divides the cable bearing element 30 in two halves. The centre line 32 can extend in the direction of travel of a vehicle (see arrow 18 in FIG. 3). The cable bearing element 30 can be made of polymer.

A groove 40 extends in the direction of travel at the centre line of the cable bearing element 30. A magnetic core material can be placed in the groove 40 to form a magnetic core for the electric lines or cables to be placed within the recesses 31, 33, 34. Within this description, "core" does not mean that the electric lines are wound around the core, but that magnetic field lines of the electromagnetic field produced by the electric lines are bundled within the core, i.e. the magnetic flux is particularly high within the core.

The recesses 31 are parallel to each other and are arranged within the same horizontal plane which is parallel to the plane of FIG. 9. The recesses 31 extend in width direction (the vertical direction in FIG. 9), which is similar to the aforementioned lateral direction of the cable bearing element 20 (see FIG. 4), over about three quarters of the total width of cable bearing element 30. They are arranged symmetrically to the centre line 32.

Each recess has a U-shaped cross-section to receive a cable. The dashed lines shown in FIG. 9 which extend along the recesses 31 are centre lines of the recesses 31. At each of the two opposite ends of the straight recesses 31 (which are similar to the lateral sections 23 shown in FIG. 5), there are bifurcated curved recess regions 33 (which are similar to the curved sections 25 shown in FIG. 5) which form transitions to a peripheral straight recess 34 (which is similar to a longitudinal section 22 shown in FIG. 5) extending along the lateral edge of the cable bearing element 30. Cables can be laid in a manner consecutively extending from the straight recesses 31 through the curved recess region 33 into the peripheral straight recess 34, thereby changing the direction of extension from perpendicular to the direction of travel to parallel to the direction of travel.

The curved recess regions 33 allow for placing a cable, which extends through the recess 31, in such a manner that it continues to either the left or the right, if viewed in the straight direction of the recess 31. For example, a cable (not shown in FIGS. 8 and 9) may extend through recess 31b, may turn to the right—while extending through recess region 33—and may then extend through the straight recess 34 which extends perpendicularly to the recesses 31 on the opposite side of curved recess region 33. There are two peripheral straight recess regions 34 on opposite sides of cable bearing element 30. The cable may then turn to the right through the recess region 33 at the end of recess 31e and may then extend through recess 31e. At the end of recess 31e, which is shown in the lower part of FIG. 8, the cable may again turn left through recess region 33 into the other straight recess 34. The other recesses 31 may be used for two other cables.

Figure 10:
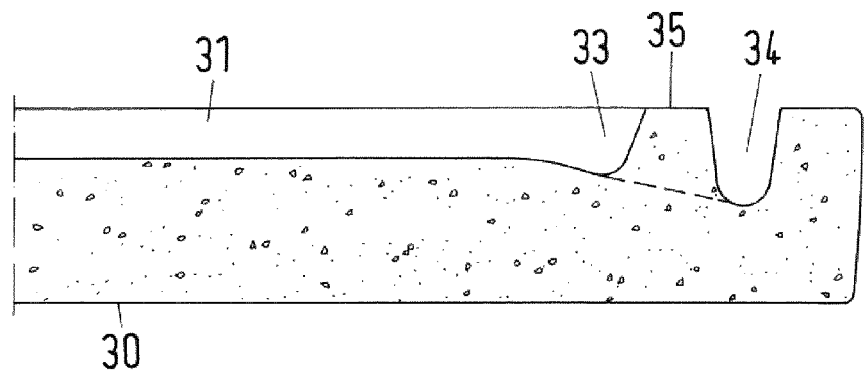

As shown in FIG. 10, the depth of the recesses 31, 33, 34 is different. The depth of recess 31 is sufficient to receive one cable. The depth of the curved recess region 33 increases from the end of recess 31 to recess 34 as indicated by a dashed line in FIG. 10. The bottom profile of the curved recess region 33 is not fully shown in FIG. 10, since the sectional view includes a region 35 of cable bearing element 30 which is not recessed. Each of the curved recess regions 33 comprises such an island region 35 which is located between the two curved branches of the curved recess region 33. One of the branches extends above the plane of FIG. 10 and the other branch extends below the plane of FIG. 10. In addition, the island region 35 is located between the straight recess 34 and the two branches of the curved recess region 33.

Since the depth of the curved recess region 33 increases towards the straight recess 34, different cables can be laid upon one another. The depth of the straight recess 34 is sufficient to arrange two cables upon one another extending in the same straight direction. For example, a first cable may extend through the lower recess 34 in FIG. 9 and may turn left into recess 31b through the recess region 33 shown in the bottom left part of FIG. 9. In addition, a second cable may extend trough recess 31a, may turn into the recess 34, thereby crossing (if viewed from above) the first cable.

The example concerning the extension of cables or electric lines 2a, 2b, 2c (see FIG. 5) given above refers to one specific application for laying three meandering cables. However, the use of the cable bearing element 30 shown in FIGS. 8 to 10 is not restricted to this application. Rather, for example, less or more than three cables can be laid using the cable bearing element 30 shown in FIGS. 9 and 10.

The side surfaces of cable bearing element 30 shown in FIG. 8 comprise recesses, in particular bores, 36a, 36b, 37a, 37b, 37c. Other recesses are located at the side surfaces which are not visible in FIG. 8. In the example shown, the side surface which extends in the direction of travel (on the right hand side in FIG. 8), which can also be referred to as lateral outer surface of the cable bearing element 30, comprises three recesses 37a, 37b, 37c. All recesses 37 contain a non-metallic anchorage bar 38a, 38c, wherein the anchor bar 38b is not shown. The anchorage bars 38 extend as projections from the side surface. When the pavement material 3 is casted, the anchorage bars 38 are embedded by the pavement material 3. The anchorage bars 38 can be part of armouring elements of the pavement slab assembly 1, e.g. part of armour rods or part of cross bars forming a reinforcement cage of the pavement slab assembly.

The recesses 36a, 36b of the side surface which faces in the direction of travel, which can be referred to as rear outer surface of the pavement slab assembly 1, also comprise non-metallic anchors 39, wherein the anchor of recess 36a is not shown in FIG. 8.

These anchors can be fixed within the recesses 36 before a neighbouring cable bearing element of a neighbouring pavement slab assembly (not shown in FIG. 8) is placed near the side surface. The neighbouring pavement slab assembly can be moved such that is cable bearing element 30 is moved towards the side surface of cable bearing element 30 so that the anchors 39 are inserted in corresponding recesses of the neighbouring cable bearing element. Then, or immediately before, filling material is introduced in the corresponding recesses of the neighbouring cable bearing element in order to fill gaps between the anchors 39 and the corresponding recesses. The filling material may be a true-component adhesive.

Alternatively, the anchors 39 can be part of armouring elements of the pavement slab assembly 1, e.g. part of armour rods or part of main bars forming a reinforcement cage of the pavement slab assembly 1.

The invention claimed is:

1. A pavement slab assembly for a route for vehicles driving or standing on a surface of the route, wherein:
   the pavement slab assembly comprises pavement material,
   the pavement slab assembly comprises a cable bearing element adapted to position or to hold a plurality of line sections of one or more electric lines,
   the electric line or lines extends or extend along or under the surface of the pavement slab assembly,
   wherein the cable bearing element is embedded in the pavement material of the pavement slab assembly,
   the cable bearing element is arranged within the pavement slab assembly such that the cable bearing element is enclosed by the pavement material
   wherein
   the pavement slab assembly comprises one or more armouring elements, wherein the armouring element or elements is or are non-metallic armouring elements.

2. The pavement slab assembly of claim 1, wherein at least one end section of the cable bearing element has a tapered or frustumed shape.

3. The pavement slab assembly of claim 1, wherein the cable bearing element is a one-piece element or comprises at least two subelements.

4. The pavement slab assembly of claim 1, wherein the pavement slab assembly further comprises a non-metallic positioning element, wherein the cable bearing element and a positioning element are arranged such that the cable bearing element is positioned at a predetermined position within the pavement slab assembly.

5. The pavement slab assembly of claim 1, wherein the cable bearing element consists of a polymer.

6. The pavement slab assembly of claim 4, wherein the positioning element is designed as an armouring element.

7. The pavement slab assembly of claim 1, wherein the pavement slab assembly comprises at least one shielding element or one magnetic core element.

8. The pavement slab assembly of claim 7, wherein the pavement slab assembly comprises at least one shielding element and one magnetic core element, wherein the shielding element and the magnetic core element form a one-piece magnetic shielding element.

9. The pavement slab assembly of claim 8, wherein the magnetic shielding element is covered by a protective material.

10. The pavement slab assembly of claim 8, wherein the shielding element or the magnetic core element, which are part of a first magnetic shielding element, is or are C-shaped or I-shaped.

11. The pavement slab assembly of claim 8, wherein the shielding element or the magnetic core element, which are part of another magnetic shielding element, are designed such that the magnetic shielding element is formed as layer.

12. The pavement slab assembly of claim 8, wherein the magnetic shielding element comprises at least one non-metallic anchorage element.

13. The pavement slab assembly of claim 1, wherein the pavement slab assembly further comprises a detection assembly for detecting a vehicle to be charged.

14. The pavement slab assembly of claim 1, wherein the pavement slab assembly comprises at least one feeder line for providing electric energy to at least one electric line, wherein the feeder line is at least partially shielded by a shielding conduit.

15. The pavement slab assembly of claim 1, wherein the pavement slab assembly comprises a lifting element for lifting the assembly.

16. The pavement slab assembly of claim 15, wherein the lifting element is designed as a non-metallic carrier element which protrudes from a surface of the pavement slab assembly.

17. The pavement slab assembly of claim 1, wherein the cable bearing element or at least one subelement of the cable bearing element has at least one void.

18. A route for vehicles driving or standing on a surface of the route, wherein the route comprises a plurality of pavement slab assemblies according to claim 1, wherein the pavement slab assemblies are arranged with respect to one another such that a driving surface is provided.

19. A method for building a route for vehicles driving or standing on a surface of the route, wherein the following steps are performed:
   providing a plurality of pavement slab assemblies according to claim 1,
   installing the pavement slab assemblies on a prepared base or foundation such that a driving surface or standing surface for vehicles which are driving or standing on the route is provided.

20. The pavement slab assembly of claim 1, wherein the pavement slab assembly is formed by a casting mould.

* * * * *